UNITED STATES PATENT OFFICE.

FRITZ SINGER AND ERNST MILARCH, OF OFFENBACH-ON-THE-MAIN, GERMANY, ASSIGNORS TO CORPORATION OF CHEMISCHE FABRIK GRIESHEIM ELEKTRON, OF FRANKFORT-ON-THE-MAIN, GERMANY.

PROCESS OF MAKING ANTHRAQUINONE.

1,103,383.  Specification of Letters Patent.  Patented July 14, 1914.

No Drawing.  Application filed January 8, 1914.  Serial No. 810,959.

*To all whom it may concern:*

Be it known that we, FRITZ SINGER and ERNST MILARCH, both chemists and doctors of philosophy, citizens of the German Empire, and residents of Offenbach-on-the-Main, in the Grand Duchy of Hesse, with post-office addresses Mainstrasse 179 and Isenburgring 12, respectively, have invented new and useful Improvements in Processes of Making Anthraquinone, of which the following is a specification.

Our invention relates to a process of transforming anthracene into anthraquinone with nitric acid.

The process consists in first treating anthracene with nitric acid at a temperature under 60° C. in presence of an indifferent liquid and in then transforming the intermediate product thus obtained, which is a mixture of unstable meso-nitro derivatives of anthracene into anthraquinone in presence of nitric acid at higher temperatures than 60° C. As liquids can be used all organic liquids, which resist to nitric acid, such as for instance glacial acetic acid, nitrobenzene, chlorobenzene, trichlorobenzene.

The process is technically very important it being suitable not only for pure anthracene, but also for less pure anthracene with the same success.

Compared with the process described in the specification of the British Patent No. 11472 of 1910 the present process is distinguished by the light regeneration of the nitric acid, whereas the regeneration of the nitrogen-peroxid raises objections to that process on account of the water formed by the process of oxidation.

The first producers of anthraquinone, Laurent and Anderson, have used also nitric acid as oxidizing agent. But this process has never been important for technical use, because hereby a mixture of anthraquinone with its nitro derivatives is obtained, from which anthraquinone can be separated with difficulties only in a pure form (see also Graebe and Liebermann, VII supplementary volume of *Annalen der Chemie*, page 285).

In order to illustrate the new process more fully, the following examples are given, parts being by weight:

Example I: 117 parts of anthracene of 85% are suspended in 300 parts of nitrobenzene. At a temperature of 20° C. 460 parts of nitric acid of 31% are added, and then the mixture is heated to 35° C., the impurities, contained in technical anthracene, are preferably removed by filtration, and the nitric acid not used is separated. By this manner 392 parts of nitric acid of 13.4° Bé. are regained. The nitrobenzene solution is treated with 50 parts of nitric acid of 48° Bé. and heated to 105° C., until the development of red vapors, which begins at 50° C., has ceased. After cooling down the separated crystals of anthraquinone are filtered, washed with nitrobenzene and benzin and dried. The anthraquinone, thus obtained, is excellently pure and melts at 280° C. (not corrected).

Example II: 115 parts of anthracene of 86% are suspended in 210 parts of glacial acetic acid. At a temperature of 15–20° C. 175 parts of nitric acid of 62% are dropped in, and then the mixture is stirred for two days at a temperature of 15–20° C. The separated crystals are filtered, while still wet heated in 1000 parts of nitrobenzene for 4 hours to 90–105° C. after addition of 47 parts of nitric acid of 40° Bé. and worked up as described in Example I. In a very good yield pure anthraquinone is obtained, melting at 278–281° (not corrected).

Now what we claim and desire to secure by Letters Patent is the following:

The process of making anthraquinone consisting in first treating anthracene with nitric acid at a temperature under 60° C. in presence of an indifferent liquid and in then transforming the intermediate product thus obtained into anthraquinone in presence of nitric acid at higher temperatures than 60° C.

In testimony, that we claim the foregoing as our invention, we have signed our names in presence of two witnesses, this twenty-third day of December 1913.

FRITZ SINGER.
ERNST MILARCH.

Witnesses:
VIKAS STANDHARDT,
ELSE HITZEROTH.